US010880238B2

(12) United States Patent
Dojwa (10) Patent No.: US 10,880,238 B2
(45) Date of Patent: Dec. 29, 2020

(54) CHAT-BASED METHOD AND SYSTEM FOR DISPLAYING TO THE END USER GREETINGS OR CUSTOM MESSAGES BASED ON QUALIFIERS

(71) Applicant: Marcin Dojwa, Wroclaw (PL)

(72) Inventor: Marcin Dojwa, Wroclaw (PL)

(73) Assignee: LiveChat Software S.A., Wroclaw (PL)

( * ) Notice: Subject to any disclaimer, the term of this patent is extended or adjusted under 35 U.S.C. 154(b) by 0 days.

(21) Appl. No.: 16/258,806

(22) Filed: Jan. 28, 2019

(65) Prior Publication Data

US 2020/0244603 A1  Jul. 30, 2020

(51) Int. Cl.
*G06Q 10/00* (2012.01)
*G06Q 10/06* (2012.01)
*H04M 3/523* (2006.01)
*H04L 12/58* (2006.01)
*H04L 29/08* (2006.01)
*G06F 16/954* (2019.01)

(52) U.S. Cl.
CPC .............. *H04L 51/02* (2013.01); *H04L 51/04* (2013.01); *H04L 67/02* (2013.01); *G06F 16/954* (2019.01); *G06Q 10/00* (2013.01); *G06Q 10/063112* (2013.01); *H04L 67/20* (2013.01); *H04M 3/5232* (2013.01); *H04M 3/5238* (2013.01); *H04M 2203/40* (2013.01)

(58) Field of Classification Search
None
See application file for complete search history.

(56) References Cited

U.S. PATENT DOCUMENTS

| | | | |
|---|---|---|---|
| 2002/0146668 A1* | 10/2002 | Burgin | G06F 16/954 434/118 |
| 2012/0296682 A1* | 11/2012 | Kumar | G06Q 10/00 705/7.11 |
| 2017/0111507 A1* | 4/2017 | McGann | H04L 67/02 |

* cited by examiner

*Primary Examiner* — Nicholas R Taylor
*Assistant Examiner* — Ho T Shiu
(74) *Attorney, Agent, or Firm* — Jacob Eisenberg (57) ABSTRACT

The embodiment is a chat-based method to display to the end user a greeting or a custom message based on qualifiers saved in the database. The system allows triggering interaction between a web page visitor and the embodiment user being a webpage or application owner. Real-time processing and conditions set up in the HTTP Server and Customer State server allows associating particular visitors with conditions which may be either inclusive or exclusive based on one or more logical qualifiers. It allows the user of the embodiment to set up a velocity with which agents may be able to respond as an outcome of potential greeting what shall address the issues of queues delaying customer service process.

2 Claims, 8 Drawing Sheets

Choose greeting type, then go ahead and customize it:

Welcome first-time visitors
Send an automatic welcome message to all new website visitors.

Engage returning customers
Reach out to people who have previously visited your website.

Save carts from abandonment
Help customers who need some assistance to make a purchase.

Reach out to customers from a specific location
Talk with visitors from a specific country or a city about location-specific deals.

Help customers on a product page
Assist a potential customer who has visited one of your product pages.

Create a custom greeting
Decide when the greeting should show up and what it should say.

CHAT-BASED METHOD AND SYSTEM FOR DISPLAYING TO THE END USER GREETINGS OR CUSTOM MESSAGES BASED ON QUALIFIERS

BACKGROUND

This application is related to some prior art that presently appears relevant as part of the embodiment employs a method disclosed by U.S. Pat. No. 6,502,133 B1 entitled "Real-time event processing system with analysis engine using recovery information" and U.S. patent application Ser. No. 09/276,340 entitled "Real-Time Event Processing System with Subscription Model,". Nevertheless, this embodiment presents the narrow application of a real-time analysis operating engines. The clusters of databases (operating in the backend) shall serve as the basic logic allowing to implement the embodiment being a complex invention attempting to improve the selling process or communication with web page visitors customer service.

Internet in-web page embedded communication with a web page or application visitors requires well-suited incentives to effectively trigger interactions. For an online business, it becomes more and more critical to establish a relationship with visitors—potential customers. The invention provides a method which starts communication with the visitor by using so-called greeting or another self-designed message. It is pre-agent communication which may be set up basing on different qualifiers either pre-designed or personalized by the user of the embodiment. The embodiment shall be particularly beneficial for chat solutions implemented on the webpage by installation scripts.

Conventional, agent-served chat opening often fails to associate an adequate greeting with a particular visitor, provide timely assistance based on the selling process or guide through elements which hinder further desired actions of the web page visitor. What is more, such manual greeting or opening messages association may be time-consuming. The embodiment automates the process in a timely and efficient manner starting the communication at the pre-defined points using logical conditions which either by negation or inclusion display an adequate message.

SUMMARY

This embodiment provides a real-time event processing system based in-chat solution which allows displaying greetings or other custom-made messages to a web page visitors upon logical conditions set up in the database. The embodiment meets up-to-date problems related to customer service and an issue of how to facilitate relationships with potential customers visiting web pages. It uses real-time processing to display an adequate greeting or welcome message which is set up in the database. Real-time processing allows the user of the embodiment to set up a velocity with which agents may be able to respond as an outcome of potential greeting what shall address the issues of queues delaying customer service process. Furthermore, the embodiment uses logical conditions to display greeting. Such a message may be shown only if a web page visitor meets conditions set forth in the database such conditions may be both inclusive and exclusive. The embodiment allows to set up such conditions through its interface which facilitates communication between real-time processing engine, chat to which the embodiment shall be implemented and greeting database.

DETAILED DESCRIPTION

Figure 1:
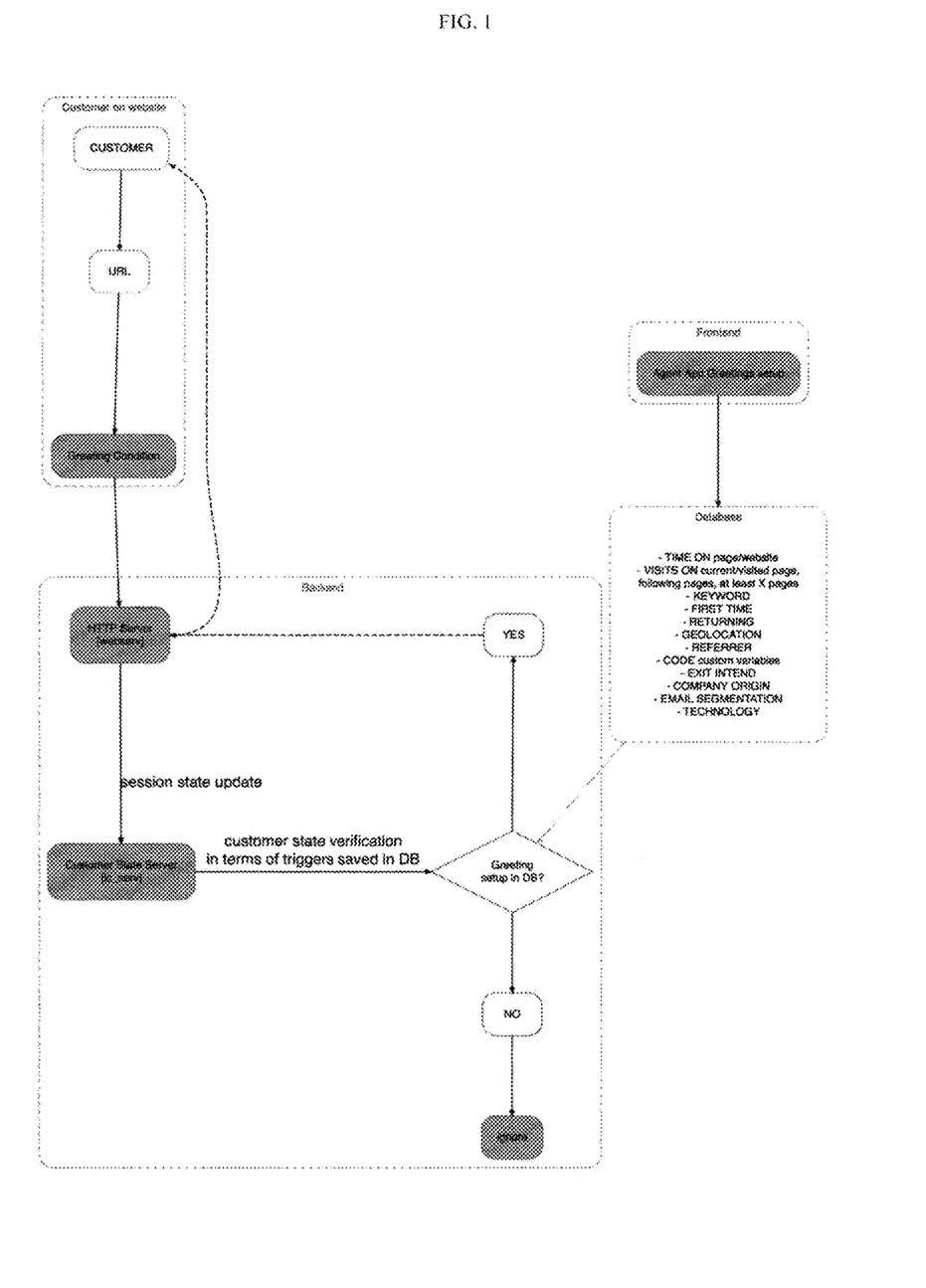
FIG. 1—an overview of the embodiment with special focus on processed which take place in the backend of the embodiment and relation between greeting selection conditions and server responsible for trigger selection.
Figure 2:
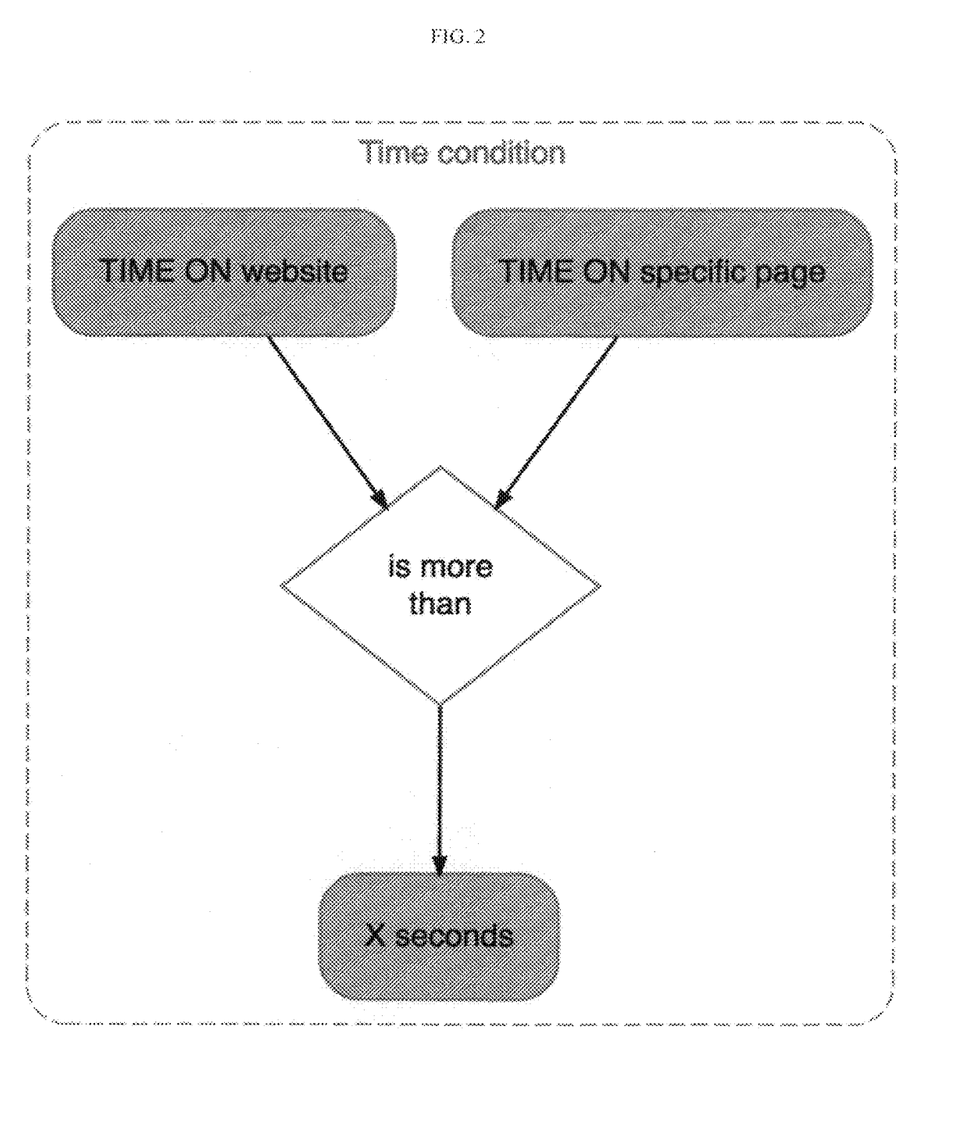
FIG. 2—an example of condition workflow based on time qualifier.
Figure 3:
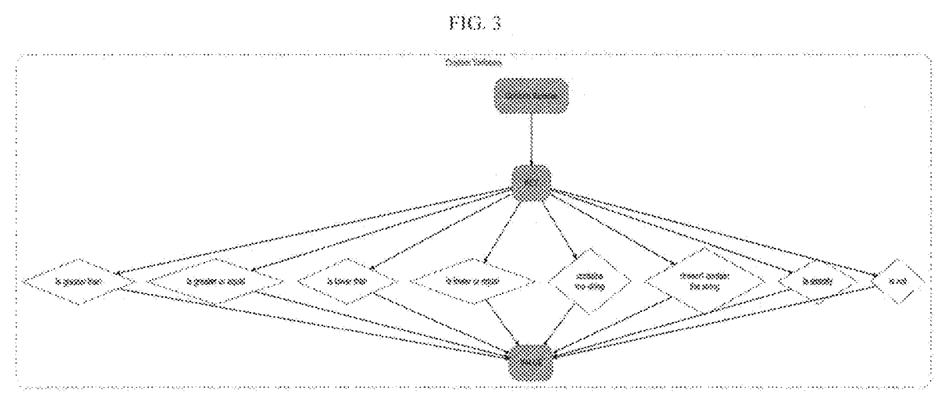
FIG. 3—custom variables scheme depicting the relation between key and value associated with the key.

The embodiment constitutes a solution for web page embedded agent served customer service. It allows starting a chat based on conditions pre-assigned by the user of the embodiment. For example, once a visitor spends on the webpage certain time (the condition is that time shall be as follows, where "t" denotes time, t<30 s, t>10 minutes and as follows). It enables, for example, service owner, to observe steps and decisions taken by the visitor and react. Depending on business needs, service owner may decide to send greeting upon time spent on the particular product, since the visitor has opened the webpage or any other condition similar. The embodiment is composed of two layers designed to interact with each other—FIG. 1. It depicts the interaction between the database and the backend layer of the invention with front end Agent App Greeting Setup. The process starts with visitor fulfilling conditions given by the embodiment user. FIG. 1 depicts it by a question if the Greeting was set up in DB (database). Among pre-designed conditions one can find qualifiers as time on the web pages, currently visited web pages, amount of visited web pages, keywords searched or otherwise used, a category of visitor (first-time visitor or recurring), geolocation, exit intend, company origin and similar. An example concerning time on a web page in a simplified form is presented by FIG. 2 which shows how greeting condition function with qualifier being "time more than X". FIG. 3 presents a complex scheme of how different keys implemented by the embodiment interacts with each other. The embodiment allows displaying certain welcome greetings adequate to the behaviour, history or sequence of activities.

Figure 4:
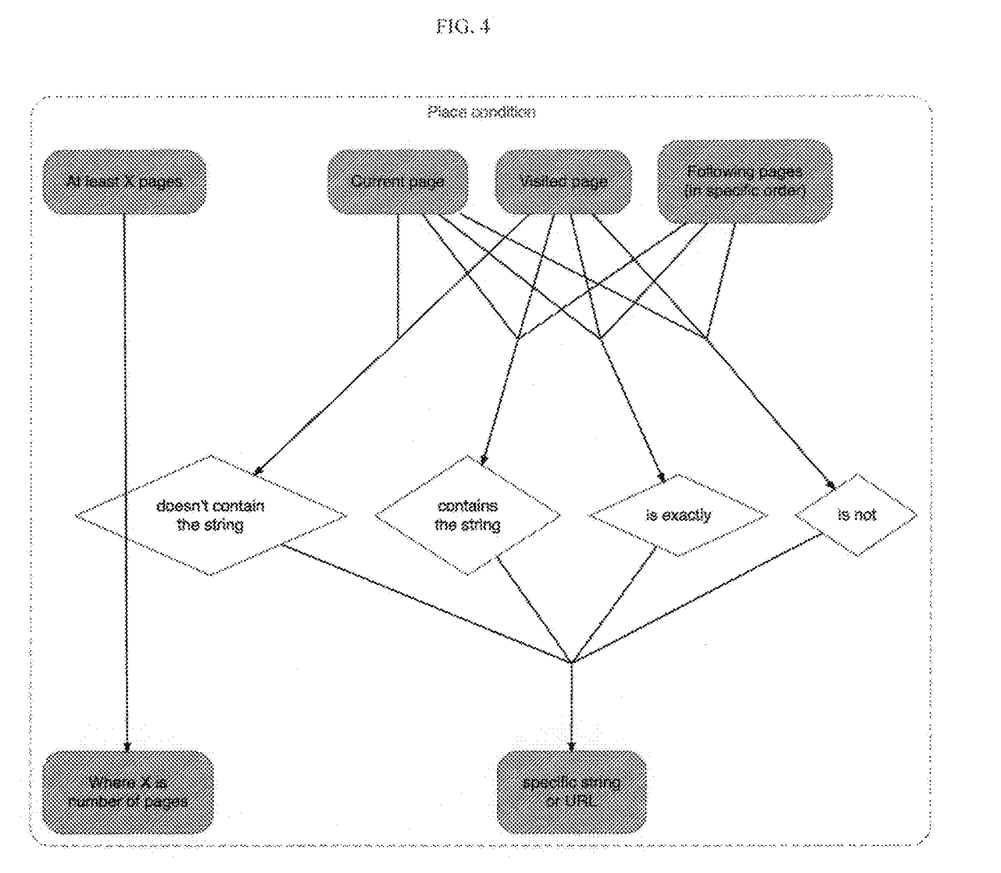
FIG. 4—an example of place variables as triggering qualifiers.
Figure 5:
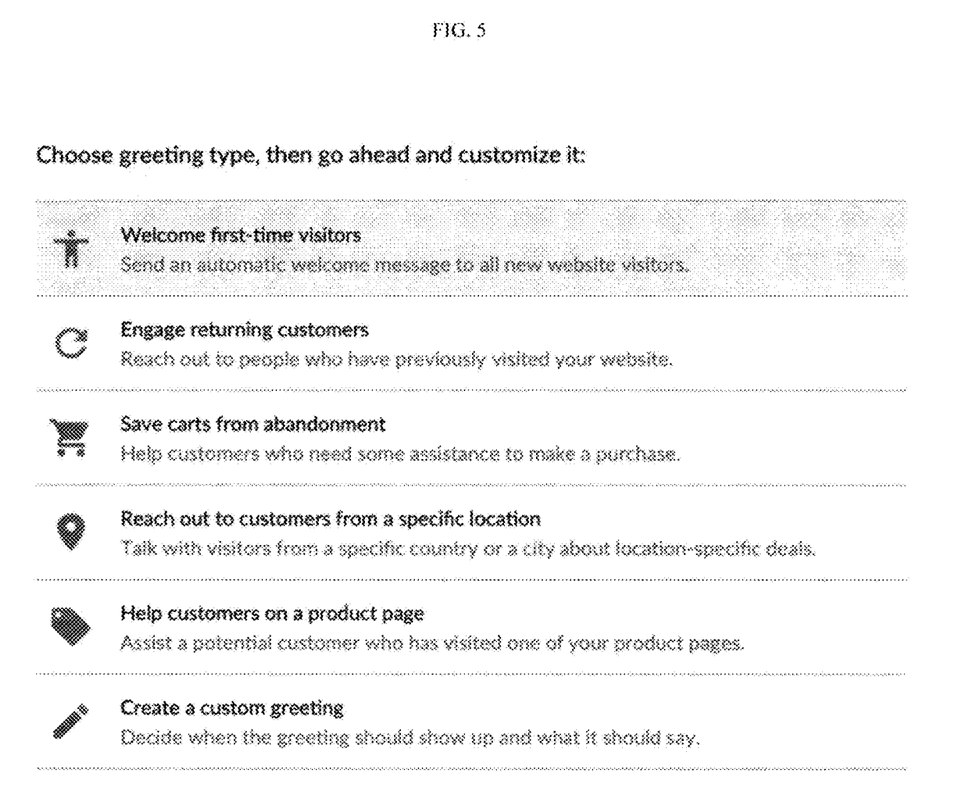
FIG. 5—user interface design prototype presenting how triggers may be displayed to potential users of the embodiment FIG. 6—logical conditions interface prototype presenting how a user may set up default and custom qualifiers.
Figure 7:
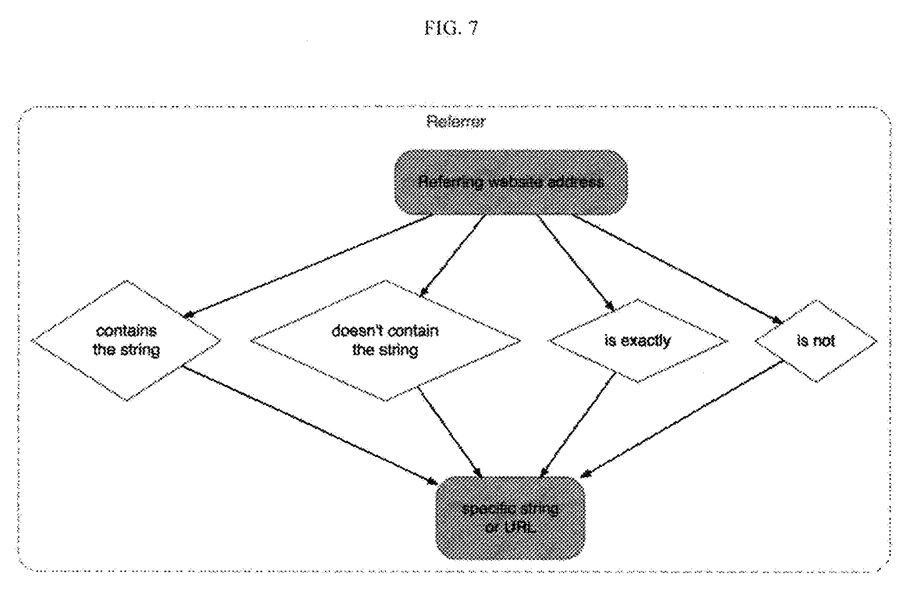
FIG. 7—an example of URL based qualifier workflow based on referring web page history.

To describe the activity as fulfilling the qualifier, FIG. 3 uses example indications of amount which may be applied, for example, "is greater than", "is greater or equal", "is lower than", "is lower or equal", "contains the string", "doesn't contain the string", "is exactly", "is not". In practice, it allows potential users of the embodiment to create different scenarios adequate to their business profiles, based upon research concerning customers, preferences or targeting. Logical qualifiers presented above allows to address different use cases as for example, showing greeting or call to action once user browses certain section of the webpage or web application. Such use case may be presented by FIG. 7 where the key is based upon referring website address where specific URL string meets qualifiers as "contains the string", "doesn't contain the string", "is exactly", "is not". All that is required to search for adequate URL which shall trigger interaction with web page visitor and facilitate it as a logical qualifier (KEY presented on FIG. 3). To enable user-friendly and accessible greeting application, the embodiment provides the interface. FIG. 5 provides a prototype of the initial step of greeting customization, where embodiment user shall be able to choose from the list of pre-designed qualifiers. The embodiment shall not exclude the possibility of custom-made qualifiers added by the user. FIG. 5 presents also potential use cases of the embodiment, in fact, it may not only engage the web page visitor in the form of greeting but also engage returning customers, motivate completion of the sales process, present welcome sentences with the language of a location of the web page visitor or assist on the product page. This presented use cases shall serve as a practical guideline for the embodiment user. As an example of a custom setting, one can see the history of previously visited pages transferred from Customer State Server. This allows to trigger action based on current page, visited pages or following pages in a certain order. Such logical construction is depicted by FIG. 4 where the greeting trigger is conditional upon other web pages visited—called Place Condition. Additionally, such Place Condition may be limited by amount qualifiers as "at least X pages", where X is a number of pages—also presented by FIG. 4. Similar logic but limited to Referring Website Address is presented by FIG. 7.

Figure 6:
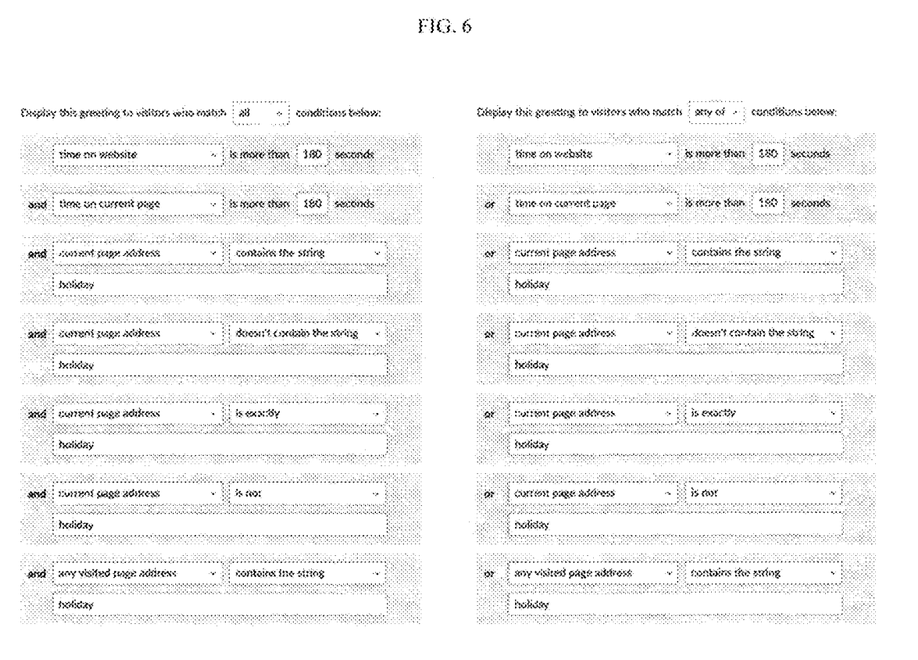

Most of conditional settings regardless of type (default or custom made) may be based on positive or negative descriptions—"contains", "equal" or "is not", "doesn't contain". Additionally, there is a possibility to apply either all triggers or to chose upon embodiment user's own discretion what is presented by FIG. 6. The interface presented by FIG. 6 allows creating joint qualifiers which require more than one element to be present once certain action shall be triggered. It also shows that by default, the interface is composed out of two columns, including repeated content with different logical operators "and", "or", what shall allow effective and accessible greetings management. At the top of both lists, it is visible that scope of application of the condition may be chosen (FIG. 6 presents an example with "all"—displaying a greeting to all visitors who fill criterions listed below and "any of" which may be triggered once at least one condition is met). Default conditions are accessible via a drop-down menu, where the embodiment user can choose out of the pre-defined list. Also, in case of string inclusion, the interface leaves the place dedicated to include information about what word (or set of words) that be included in the string to trigger action.

The Real-Time Analysis Engine interacts with chat front ends associated with the applications (FIG. 1). It receives input streams from an HTTP Server and delivers output streams to a data sink—Customer State Server. The data source needs to be triggered by web page visitor meeting conditions set up in the database. From the perspective of backend functionality (FIG. 1) Customer State Server websery decides which user shall see particular greeting while HTTP Server conveys the greeting chosen by Customer State Server. Customer State Server (lc_serv) (FIG. 1) connects with database collects greetings and functions from where the greeting is taken to be displayed by the Agent App Greeting setup (Frontend). One of the most innovative aspects of the embodiment is that all processing and message display happens in a real-time. Such approach allows to construct an efficient web page—web owner communication channel by opening chat window and displaying pre-designed content. A relation between the HTTP server and Customer Served State Server creates a real-time analysis operating engines which work in a parallel manner.

Figure 8:
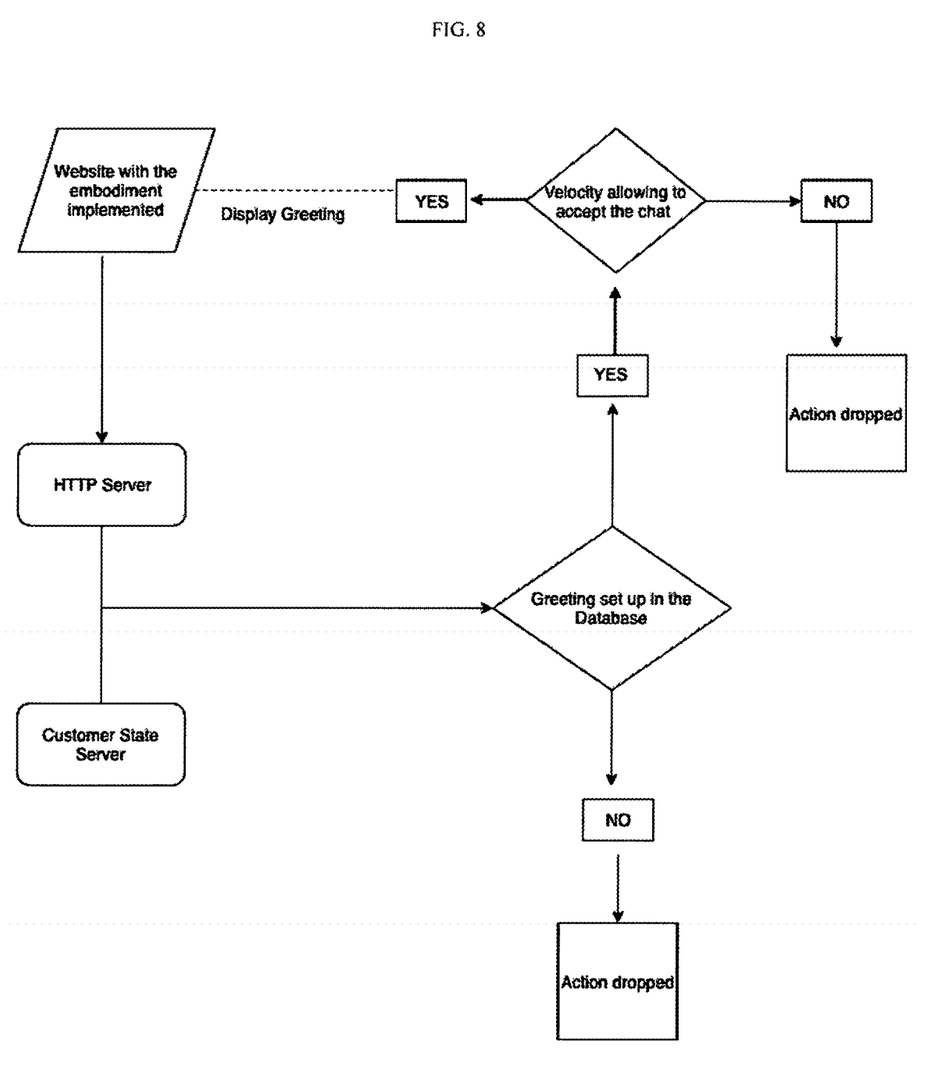
FIG. 8—Real-time velocity analysis example implemented by the embodiment.

From the perspective of the web page visitor, there are three possible reactions once greeting is displayed, namely (1) accepting the greeting, (2) lack of reaction or (3) purposive rejection of the action. This feature supported by the logic in the Real-Time Analysis Engine is used to present predictions as potential velocity with which next chat may be accepted—it serves as a crucial feature in case of implementation for agent-based customer services as this embodiment shall not allow the agent to accept more chats than potentially may be accepted. The embodiment velocity analysis is counted based on simple assumptions as the number of accepted by customers greetings from the last hour is divided by the number of greetings that were sent to customers during the same period. Real-time processing of data ensures that the result will be corrected in a natural way once any action will be more time-consuming. Flow responsible for velocity-based chat acceptance occurring as a result of greeting is depicted by FIG. 8. It shows that Customer State Server in cooperation with HTTP Server is responsible for logic which checks greeting database. FIG. 8 displays precisely the same process as FIG. 1 with the only difference of additional condition to display the greeting—if velocity may allow for the agent to display greetings. This solution shall ensure that the embodiment will not dysfunctionally deliver more touchpoint with the customer that the user of the embodiment is potentially able to manage.

What is claimed:

1. A method of automated message exchanges, further comprising steps of:
   a. receiving from a programmed system an automated message as the outcome of triggering qualifiers based on inclusive or exclusive logical conditions,
   b. programmatically determining a current context of an intended message recipient;
   c. programmatically determining a greeting to be automatically displayed upon conditions set in an embodiment, wherein the greeting is a pre-agent communication;
   d. programmatically selecting a text or media file, based on a programmatically determined context;
   e. programmatically predicting potential velocity with which a next communication may be accepted by an agent;
   f. programmatically predicting potential velocity by a velocity analysing system, and
   g. displaying an adequate greeting in line with the scheme applied by an embodiment user arrived at from real-time engine velocity analysis by the velocity analysing system; and
   h. wherein content of displayed text or media file is originated from a database and displayed through chat; and
   i. wherein the step of programmatically predicting potential velocity by a velocity analysing system further comprises the steps of
      i. determining a number of pre-agent communications accepted by customers within a time period;
      ii. determining a division of the number of accepted communications by a total number of pre-agent communications displayed within the time period; and
      iii. limiting a number of communications which may be accepted by an agent by the division for the time period.

2. The method according to claim 1:
   a. wherein a correspondence between the chat and the programmatically determined context has been specified by the intended message recipient triggers pre-designed or custom-made welcome message; and
b. the method further comprises the steps of providing information to a web page or application visitor in response to actions taken on the web page or in previous activity history collected by the server, by:
 i. automatically determining, based upon the web page or application visitor activity, an identifier of greeting data associated with the visitor; and
 ii. displaying an adequate greeting in line with the scheme applied by an embodiment user.

\* \* \* \* \*